(12) United States Patent
Wang et al.

(10) Patent No.: US 7,396,145 B2
(45) Date of Patent: Jul. 8, 2008

(54) BACKLIGHT UNIT AND METHOD FOR EQUALIZING BRIGHTNESS THEREOF

(75) Inventors: Mao-Jung Wang, Chi-Lung (TW); Chuan-Pei Yu, I-Lan Hsien (TW)

(73) Assignees: Innocom Technology (Shenzhen) Co., Ltd., Shenzhen, Guandong Province (CN); Innolux Display Corp., Miao-Li County (TW)

( * ) Notice: Subject to any disclaimer, the term of this patent is extended or adjusted under 35 U.S.C. 154(b) by 214 days.

(21) Appl. No.: 11/306,490

(22) Filed: Dec. 29, 2005

(65) Prior Publication Data
US 2007/0053189 A1    Mar. 8, 2007

(30) Foreign Application Priority Data
Sep. 2, 2005    (TW)    .............................. 94130058 A

(51) Int. Cl.
*F21V 23/04* (2006.01)
*F21V 7/04* (2006.01)
*H05B 37/02* (2006.01)

(52) U.S. Cl. ...................... 362/276; 362/251; 362/600; 362/802; 315/309

(58) Field of Classification Search ................ 345/101, 345/102, 84, 87, 106; 315/307–311, 291, 315/117, 118; 362/295, 600, 614, 552, 580, 362/234, 276, 394, 411, 802, 330, 225, 222; 323/236, 245
See application file for complete search history.

(56) References Cited

U.S. PATENT DOCUMENTS

| | | | | |
|---|---|---|---|---|
| 4,659,183 A * | 4/1987 | Suzawa | ....................... | 349/67 |
| 6,069,448 A * | 5/2000 | Yeh | ............................. | 315/149 |
| 6,825,828 B2 * | 11/2004 | Burke et al. | ................ | 345/101 |
| 7,159,999 B2 * | 1/2007 | Yoo et al. | ................... | 362/249 |
| 7,233,258 B1 * | 6/2007 | Gelinas | ..................... | 340/907 |
| 2003/0043106 A1 * | 3/2003 | Woo | ........................... | 345/101 |
| 2004/0051692 A1 * | 3/2004 | Hirakata et al. | ............. | 345/102 |
| 2004/0246722 A1 * | 12/2004 | Chang et al. | ................. | 362/276 |
| 2005/0078080 A1 * | 4/2005 | Kang et al. | ................. | 345/102 |
| 2005/0088102 A1 * | 4/2005 | Ferguson et al. | ............ | 315/149 |
| 2005/0190171 A1 * | 9/2005 | Jang et al. | .................... | 345/204 |
| 2005/0253537 A1 * | 11/2005 | Jang et al. | .................... | 315/307 |

* cited by examiner

*Primary Examiner*—John A. Ward
*Assistant Examiner*—David R Crowe
(74) *Attorney, Agent, or Firm*—Wei Te Chung

(57) ABSTRACT

A backlight module includes at least a light source generator, a housing, at least a thermal detector, and an inverter. The thermal detector is disposed in the housing for measuring the temperature within the housing when the light source generator is operating, and the inverter is electrically connected to the thermal detector and the light source generator for adjusting the electrical current of the light source generator according to the temperature measured by the thermal detector.

12 Claims, 5 Drawing Sheets

BACKLIGHT UNIT AND METHOD FOR EQUALIZING BRIGHTNESS THEREOF

BACKGROUND OF THE INVENTION

1. Field of the Invention

The invention relates to a backlight unit and method for equalizing brightness of the backlight unit, and more particularly, to a means of utilizing thermal detecting devices and a feedback system to improve the brightness equalization of the backlight unit.

2. Description of the Prior Art

As technology advances, liquid crystal displays (LCDs) have been widely utilized in digital cameras, PDAs, satellite navigation systems, and flat panel televisions. Being one of the key components of the liquid crystal displays, backlight units are optical devices utilized for providing a light source to the liquid crystal displays.

According to the location of the light source, backlight units are typically divided into two major categories: direct-type, in which the light source is generated from directly underneath the display panel, and edge light type, in which the light source generator is located adjacent to the edge of the display panel. The direct-type backlight units are able to provide a higher intensity of light and are thus more suited for large size display panels such as computer monitors and TV panels while the edge light type backlight units are poorly suited for these larger panels.

Please refer to FIG. 1. FIG. 1 is a cross-sectional view of a conventional backlight unit 10. As shown in FIG. 1, the backlight unit 10 includes a housing 12 serving as the supporting platform of the backlight unit 10, a housing 14, a plurality of light generators 16 for generating lights, a reflecting plate 18 disposed on the surface of the housing 12, a light guiding structure 20, such as a diffusing plate, disposed on the opening of the housing 14 for diffusing the light produced by the light source generator 16 upward to the liquid crystal display panel (not shown) and for providing uniformly scattered lights, and a plurality of reflectors 22 embedded on the edge of the housing 14 and the housing 12 for reflecting the light produced by the light source generator 16 along a horizontal direction to the light guiding structure 20. Additionally, an optic film is typically provided above the light guiding structure 20 for enhancing the backlight unit 10 so as to output light beams with uniform luminous intensity to the housing 12, in which the number and the position of the optical film can be varied according to the requirements of the products.

In general, the light source generator 16 in the backlight unit 10 is typically composed of a plurality of light tubes, such as cold cathode fluorescent lamps (CCFL) or external electrode florescent lamps (EEFL). To meet the requirements of high brightness and low weight, the aforementioned light source generator 16 is often installed in a very narrow and small closed chamber. Thus, the heat generated during operation will accumulate rapidly, leading to a high temperature near the light tubes after operating for a period of time. Consequently, the high temperature will interfere with the normal operation of the backlight unit 10 and deteriorate the illumination efficiency of the lamps.

Please refer to FIG. 2. FIG. 2 is a diagram showing the relationship between the brightness of the cold cathode fluorescent lamp and the ambient temperature. As shown in FIG. 2, the brightness of common cold cathode fluorescent lamps utilized for light source generators will only achieve a maximum value under certain ambient temperature. However, the interior of the direct-type backlight unit 10, especially the type utilized for large-scale liquid crystal displays will generate large amount of heat due to long hours of operation and the large quantity of cold cathode fluorescent lamps, such that the interior temperature of typical backlight units will often reach 50° C. or above and seriously decrease the illumination efficiency of the backlight unit and influence the uniformity of the brightness of the liquid crystal display. Additionally, the high temperature within the backlight unit 10 will also decrease the quality of the display, result in a flickering phenomenon in some regions of the display. This has the effect of reducing the life expectancy of the surrounding devices.

Hence, maintaining and adjusting the illumination efficiency of the backlight unit, increasing the uniformity of the brightness of the unit, and at the same time achieving satisfactory heat dissipation and maintaining the life expectancy of surrounding devices has become a critical task.

SUMMARY OF THE INVENTION

It is therefore an objective of the present invention to provide a backlight unit and method for equalizing the brightness of the backlight unit to solve the above-mentioned problem.

According to the present invention, a backlight unit includes at least a light source generator for generating lights; a housing for containing the light source generator; at least a thermal detector disposed in the housing for measuring the temperature within the housing when the light source generator is operating; and at least an inverter electrically connected to the thermal detector and the light source generator for adjusting the electrical current of the light source generator according to the temperature measured by the thermal detector.

It is another aspect of the present invention to provide a method of equalizing the brightness of a backlight unit, the method includes: providing a backlight unit, in which the backlight unit includes at least a light source generator for generating lights and a housing for containing the light source generator; providing at least a thermal detector for measuring and obtaining the temperature distribution within the housing when the light source generator is operating; and providing at least an inverter for adjusting the electrical current of the light source generator according to the temperature measured by the thermal detector.

Preferably, the present invention installs at least a thermal detector, such as a thermal couple or a thermistor on the housing of a backlight unit and utilizes the thermal detector to measure the temperature variation within the housing. In the mean time, at least an inverter is utilized to adjust the electrical current flowing to each cold cathode fluorescent lamp according to the temperature measured by the thermal detector. By partially adjusting the temperature within the backlight unit, the present invention is able to maintain illumination efficiency and increase overall illumination uniformity of the backlight unit, thereby diminishing problems such as uneven brightness caused by high temperature within the backlight unit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
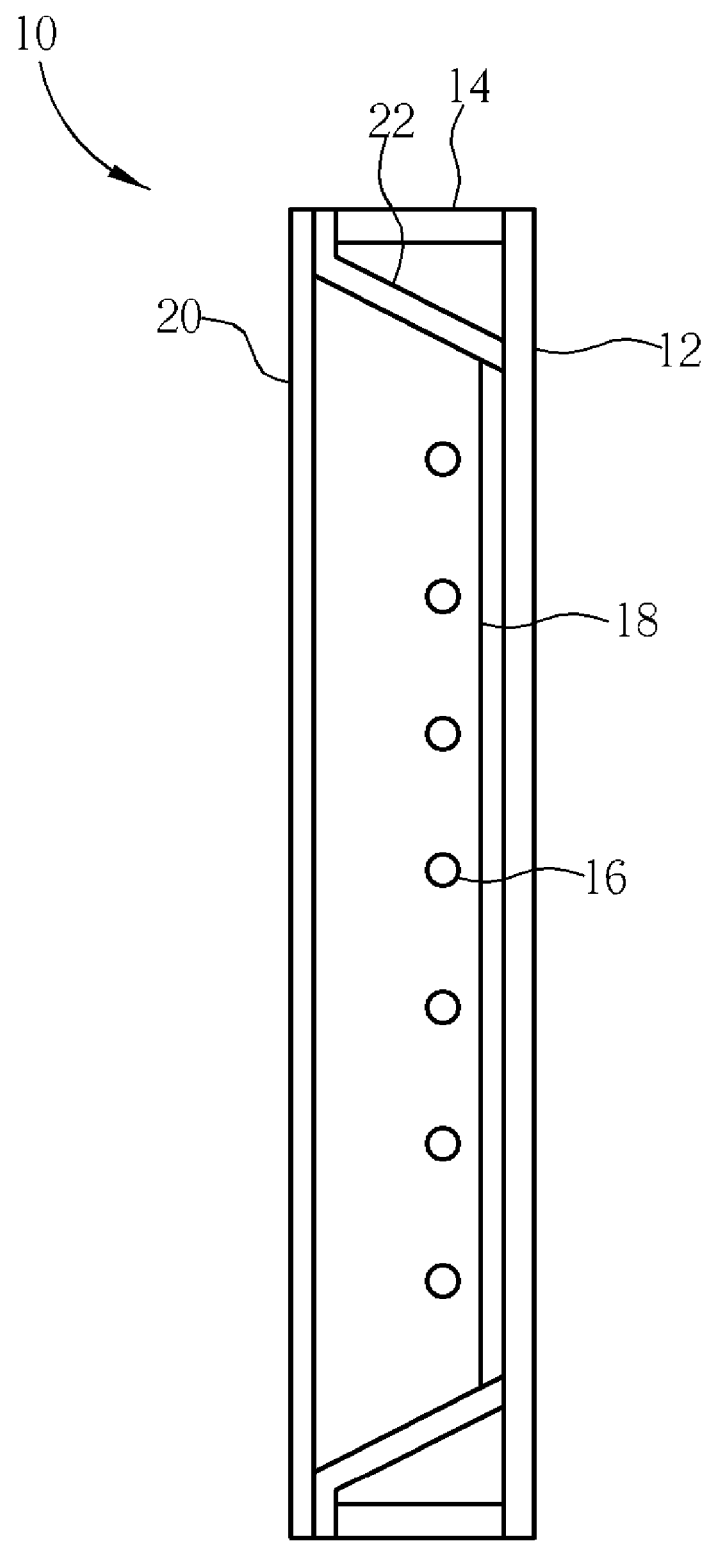
FIG. 1 is a cross-sectional view of a conventional backlight unit.
Figure 2:
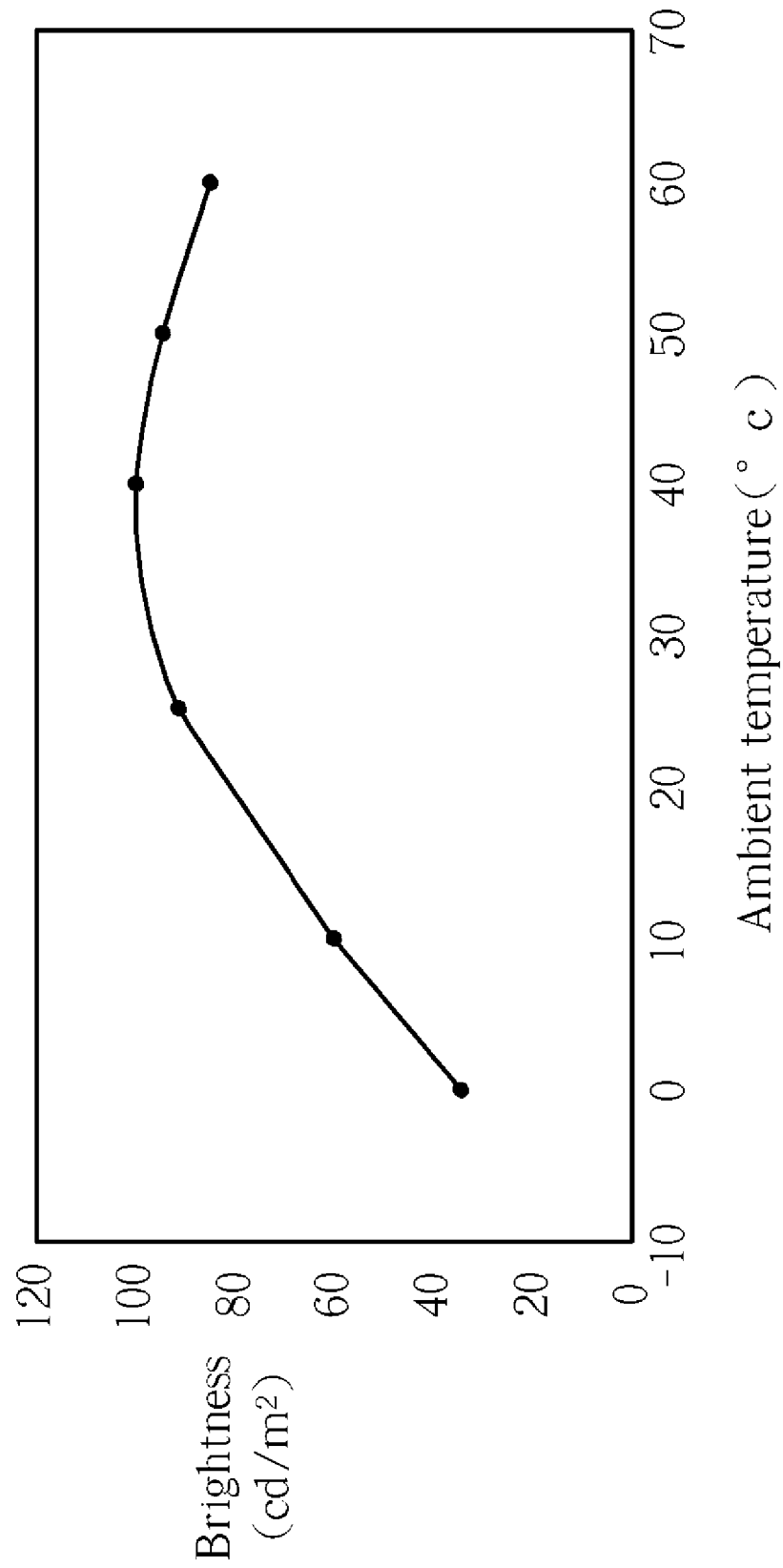
FIG. 2 is a diagram showing the relationship between the brightness of the cold cathode fluorescent lamp and the ambient temperature.
Figure 3:
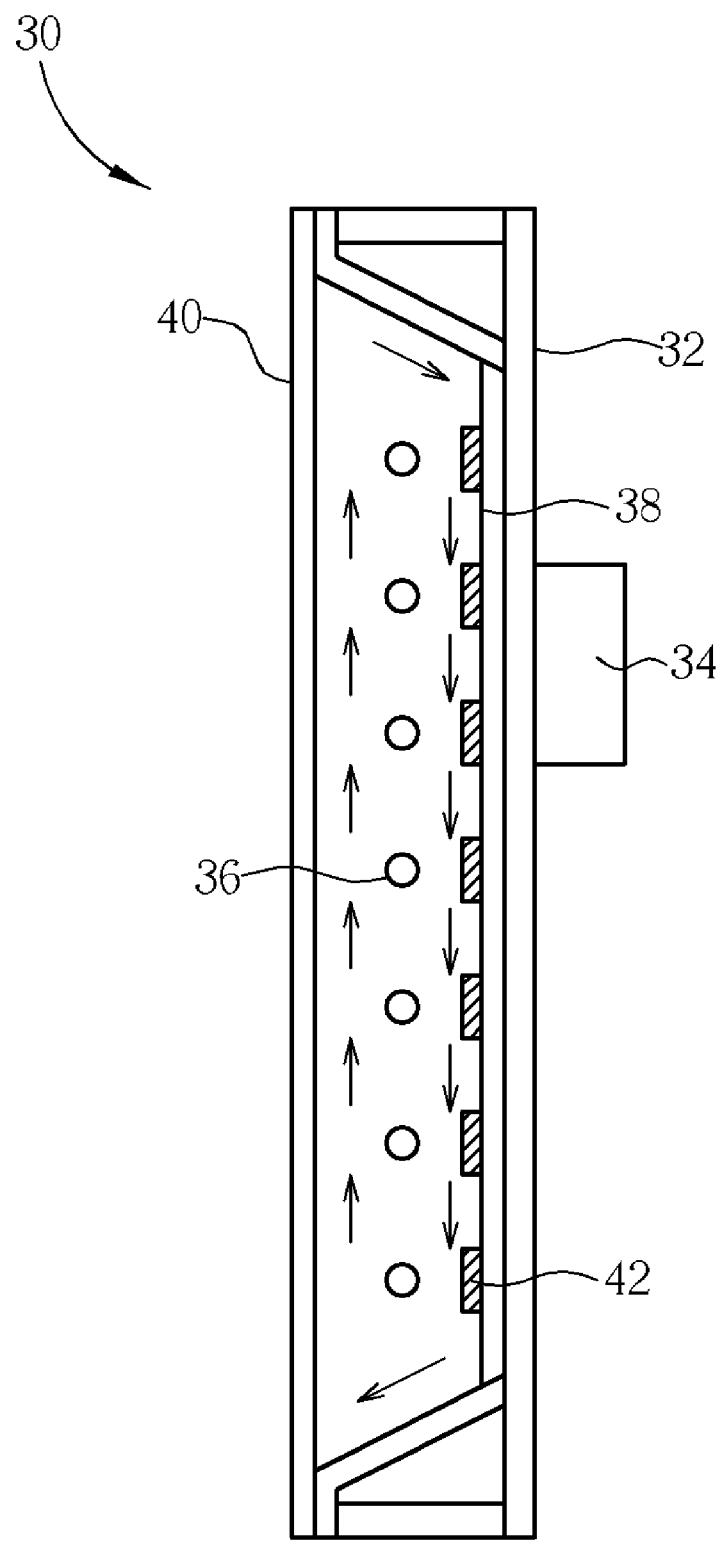
FIG. 3 is a perspective diagram showing the cross section of the backlight unit according to the first embodiment of the present invention.

Please refer to FIG. 3. FIG. 3 is a perspective diagram showing the cross section of the backlight unit according to the first embodiment of the present invention. As shown in FIG. 3, the backlight unit 30 is a direct-type backlight unit, in which the backlight unit 30 includes a housing 32, a plurality of cold cathode fluorescent lamps 36, a reflecting sheet 38 disposed on the inner surface of the housing 32, an optical assembly 40, at least a thermal detector 42 disposed between the optical assembly 40 and the housing 32, and at least an inverter 34 disposed on the external part of the housing 32 and electrically connected to the inner portion of the backlight unit 30, such as the cold cathode fluorescent lamp 36 and the thermal detector 42. Preferably, the thermal detector 42 can be a thermal couple or a thermistor, in which the thermal detector 42 is utilized to measure the temperature change within the housing 32 when the backlight unit 30 is operating. According to the preferred embodiment of the present invention, the backlight unit 30 includes a plurality of thermal detectors disposed on the inner surface of the housing 32. According to different product designs, the optical assembly 40 may include a light guiding device, one or more diffusing sheets, or one or more lenses. Preferably, the cold cathode fluorescent lamps 36 of the backlight unit 30 are disposed in parallel according to a first direction and the thermal detectors 42 are disposed according to a second direction, in which the second direction is perpendicular to the first direction. In other words, when the cold cathode fluorescent lamps 36 are aligned in parallel in the backlight unit 30, the thermal detectors 42 are aligned vertically or alternately and vertically aligned in the inner surface of the housing 32 of the backlight unit 30 and when the cold cathode fluorescent lamps 36 are aligned vertically in the backlight unit 30, the thermal detectors 42 are aligned in parallel in the surface of housing 32. By following this arrangement, each thermal detector 42 can be ensured to measure the temperature of a particular cold cathode fluorescent lamp or a particular region of cold cathode fluorescent lamps 36.

As described previously, when the backlight unit is operating, the high temperature environment within the unit will directly influence the illumination of the cold cathode fluorescent lamps 36. For instance, when the environment temperature is too hot, the illumination efficiency of the cold cathode fluorescent lamps will decrease and produce dark areas. In general, as the cold cathode fluorescent lamps are turned on, the heat distribution within the backlight unit will begin to produce heat energy causing the temperature to rise and resulting in a heat circulation effect (as shown by the arrows) in the backlight unit. Hence, when the backlight unit is operating, the hot air will be distributed in the upper region of the backlight unit and the air with lower temperature on the other hand will be concentrated in the lower region of the backlight unit. In the same time, the different heat distribution in the backlight unit will cause each cold cathode fluorescent lamp 36 to produce different illumination efficiency and result in uneven brightness of the backlight unit. By utilizing the thermal detectors disposed in the backlight unit to measure the temperature variation within the unit, the present invention is able to feedback the data measured by the thermal detectors to the light source generator that controls the cold cathode fluorescent lamps. After the data is received by the light source generator, a logic circuit will be utilized to control the electrical current of each cold cathode fluorescent lamp 36 and partially adjust the uneven brightness phenomenon caused by the temperature variation.

Figure 4:
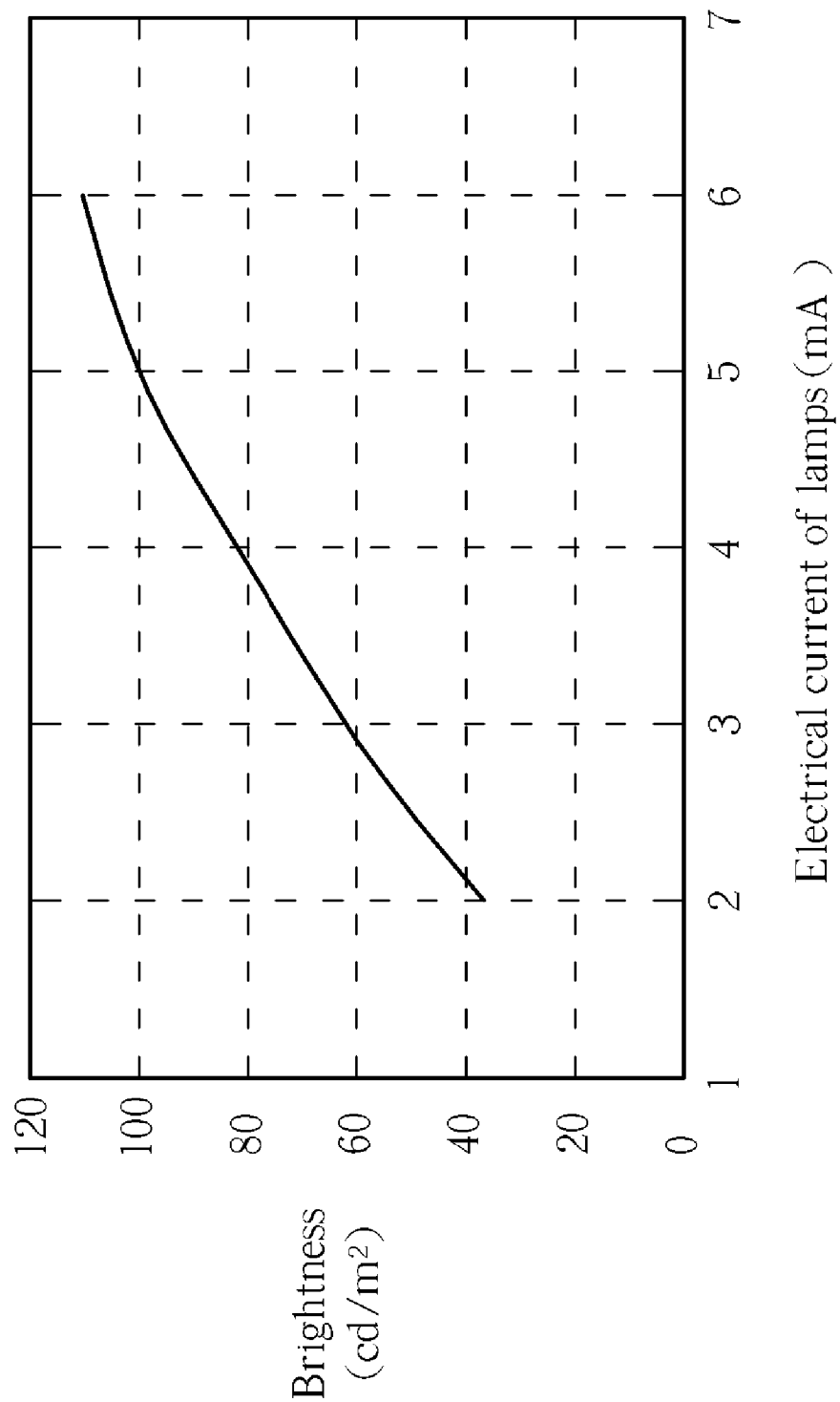
FIG. 4 is a diagram showing the relationship between the brightness of the cold cathode fluorescent lamps and the electrical current of the lamps.

Please refer to FIG. 4. FIG. 4 is a diagram showing the relationship between the brightness of the cold cathode fluorescent lamps and the electrical current of the lamps. As shown in FIG. 4, the relationship between the brightness of the cold cathode fluorescent lamps and the electrical current of the lamps demonstrate a positive correlation. Hence, when a user increases the electrical current of the lamps, the brightness of the lamps will increase proportionally. According to this characteristic, the present invention utilizes at least a thermal detector to measure the temperature change within the backlight unit and manipulates the light source generator to control the electrical current flowing to each lamp. In other words, when the temperature of a certain region of the backlight unit is too high, the illumination efficiency of the lamps of that particular region will decrease accordingly. Hence, users are able to increase the electrical current of the lamps in that region to increase the brightness of the lamp thereby achieving a uniform brightness. Conversely, when the temperature of a particular region of the backlight unit is much lower and the brightness of that region is greater, users are able to selectively decrease the electrical current of the lamps in that region and achieve a uniform brightness. After the electrical current is decreased, the temperature of that region will decrease and improve the heat dissipation accordingly. In addition to the cold cathode fluorescent lamps described previously, the present invention is able to utilize at least an external electrode fluorescent lamp (EEFL) as the light source generator for the backlight unit. Moreover, a plurality of thermal devices can be installed on the housing of the backlight unit and electrically connected to the thermal detectors located on the exterior of the backlight unit, in which the thermal detectors are utilized to measure the temperature variation within the backlight unit.

Figure 5:
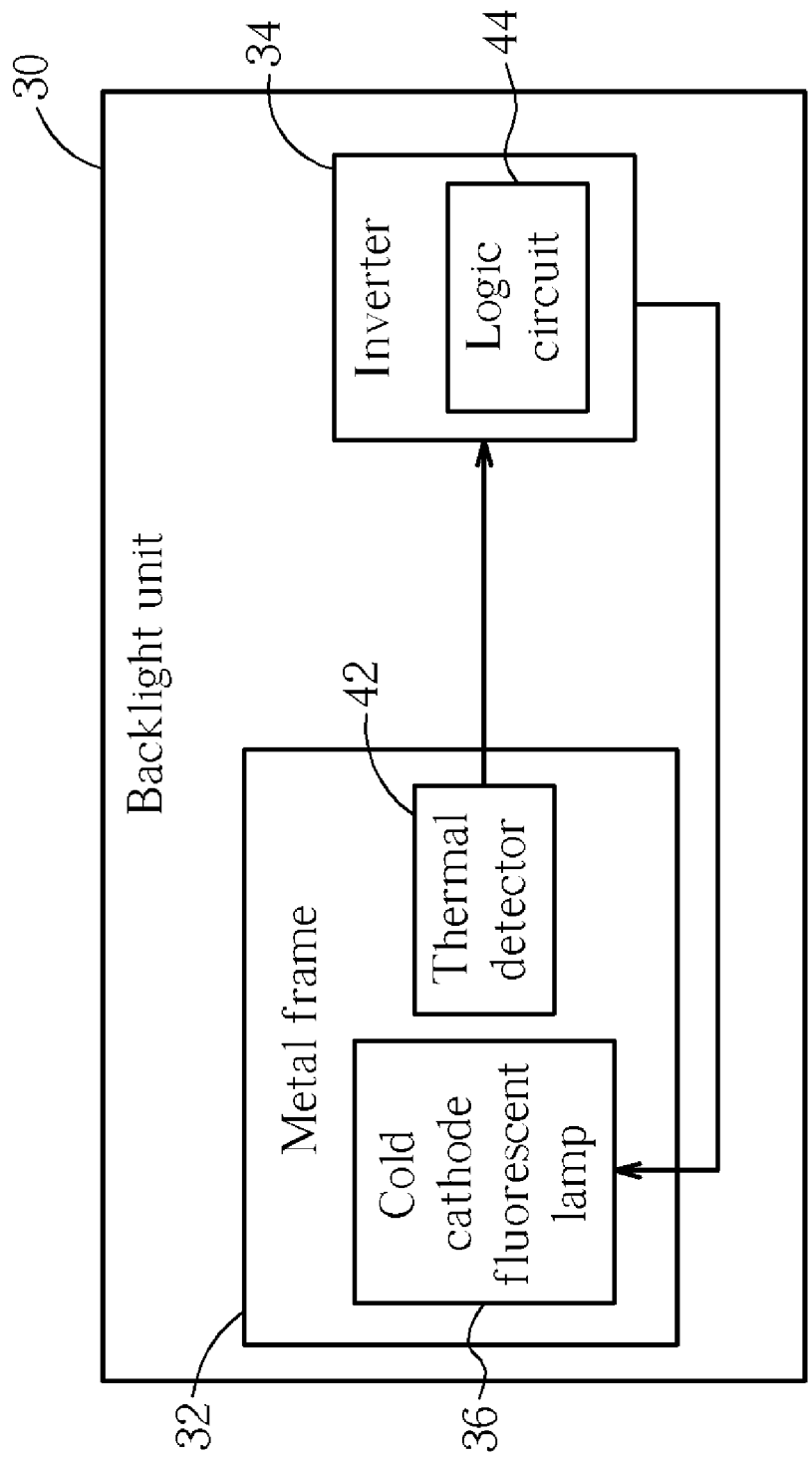
FIG. 5 is a block diagram showing the means of equalizing the brightness of a backlight unit according to the present invention.

Additionally, a method of equalizing the brightness of the backlight unit is disclosed. Please refer to FIG. 5. FIG. 5 is a block diagram showing the means of equalizing the brightness of a backlight unit according to the present invention. As shown in FIG. 5, a backlight unit 30 is provided, in which the backlight unit 30 includes at least a light source generator, such as a cold cathode fluorescent lamp 36, and a housing 32 enclosing the light source generator. Next, at least a thermal detector 42 is provided and utilized to measure the temperature distribution within the housing 32 and obtain the distribution data according to the measurement. Next, at least an inverter 34 is provided and electrically connected to the thermal detectors 42, in which the logic circuit 44 within the inverter 34 is utilized to increase or decrease the electrical current of the light source generator according to the temperature distribution measured by the thermal detector 42. Preferably, a plurality of thermal devices can also be disposed on the housing 32 of the backlight unit 30, in which the thermal devices are electrically connected to the thermal detectors 42 and the thermal detectors 42 are then utilized to measure the temperature change within the backlight unit 30. Additionally, the light source generator is aligned according to a first direction and the thermal devices contained in the thermal detectors 42 are aligned according to a second direction, in which the first direction is perpendicular to the second direction.

In general, the cold cathode fluorescent lamps contain mercury and other gases such as neon or argon, and the amount and proportion of the gases contained in the lamps and the pressure utilized for pumping the gases will directly influence the illumination efficiency of the lamp. Hence, the present invention can also utilize the thermal detectors described in the previous embodiments to adjust the ingredient, proportion, and pressure of the gases that are added to the cold cathode fluorescent lamps according to the temperature distribution measured by the thermal detectors, thereby balancing the illumination and proving uniformity to the brightness of the backlight unit.

In contrast to the conventional method, the present invention primarily installs at least a thermal detector, such as a thermal couple or a thermistor on the housing of a backlight unit and utilizes the thermal detector to measure the temperature variation within the back light unit. Additionally, at least an inverter is utilized to adjust the electrical current flowing to each cold cathode fluorescent lamp according to the temperature measured by the thermal detector. By partially adjusting the temperature within the backlight unit, the present invention is able to maintain the illumination efficiency, increase the overall illumination uniformity of the backlight unit, and achieves satisfactory heat dissipation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of equalizing the brightness of a backlight unit comprising:
   providing a backlight unit, the backlight unit comprising:
   at least a light source generator for generating light; and
   a housing for containing the light source generator;
   providing a plurality of thermal detectors for measuring and obtaining the temperature distribution within the housing when the light source generator is operating;
   providing at least an inverter for adjusting the electrical current of the light source generator according to the temperature measured by the thermal detectors; and
   utilizing the inverter to increase the electrical current of the light source generator in the higher temperature region of the housing after the temperature distribution obtained.

2. The method of claim 1, wherein the thermal detector comprises thermal couple or thermistor.

3. The method of claim 1, wherein the backlight unit further comprises at least an optical assembly disposed on one side of the light source generator and fixed on the housing.

4. The method of claim 3, wherein the optical assembly comprises a light guiding device, one or more diffusing sheets, and one or more lenses.

5. The method of claim 1, wherein the backlight unit further comprises a reflecting sheet disposed on the inner surface of the housing.

6. The method of claim 1, wherein the backlight unit comprises a direct-type backlight unit.

7. The method of claim 1 further comprising utilizing the inverter to decrease the electrical current of the light source generator in the lower temperature region of the housing after the temperature distribution is obtained.

8. The method of claim 1, wherein the backlight unit comprises a plurality of light source generators and the inverter is utilized to control the electrical current of each light source generator after the temperature distribution is obtained.

9. The method of claim 8, wherein the light source generators are aligned in parallel according to a first direction, the thermal detectors are aligned according to a second direction, wherein the thermal detectors further comprise a plurality of thermal devices.

10. The method of claim 9, wherein the first direction is perpendicular to the second direction.

11. The method of claim 1 further comprising a logical circuit for adjusting the electrical current of the light source generator.

12. The method of claim 1, wherein the light source generator comprises cold cathode fluorescent lamp or external electrode fluorescent lamp.

\* \* \* \* \*